Oct. 30, 1928.　　F. R. ALLEN ET AL　　1,690,045
DUMP BODY
Filed June 23, 1926　　2 Sheets-Sheet 1
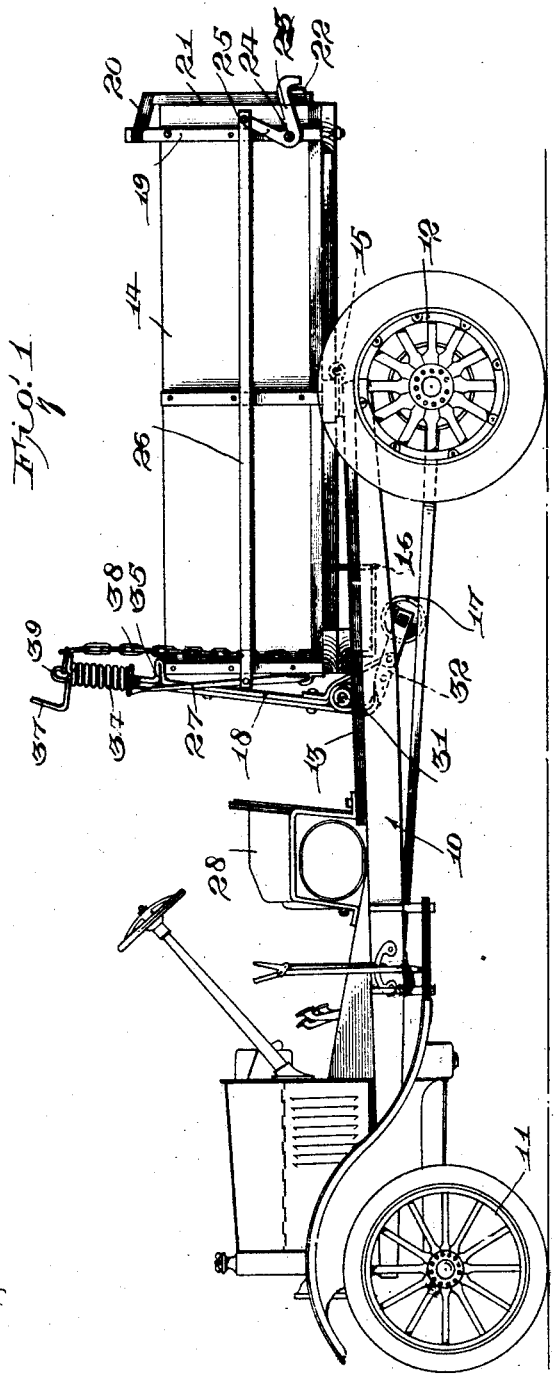

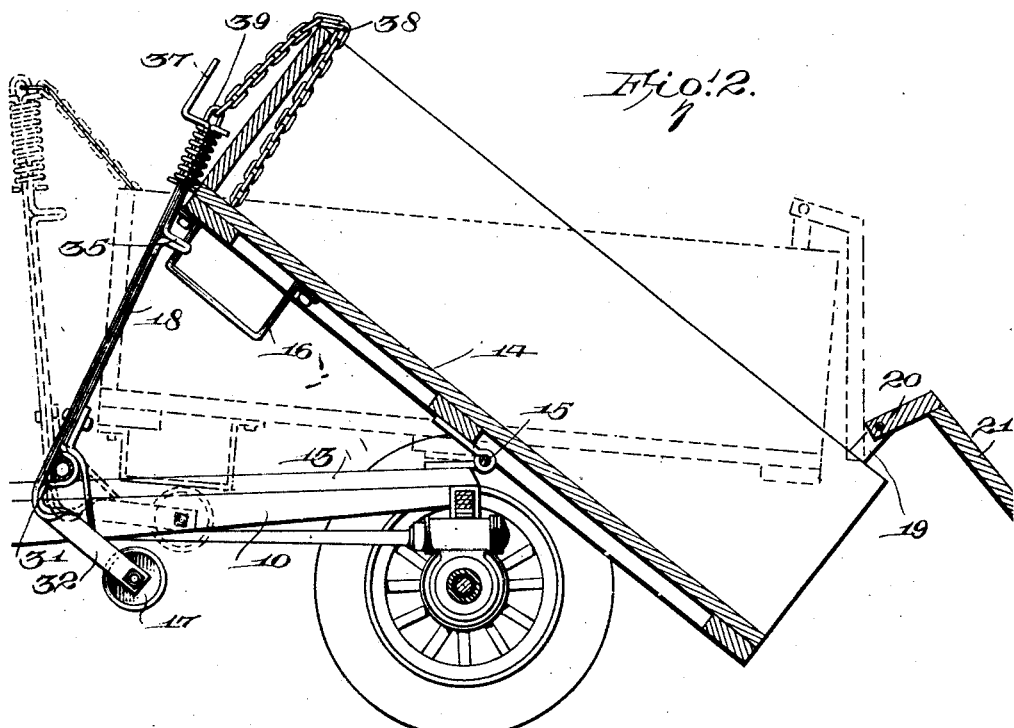
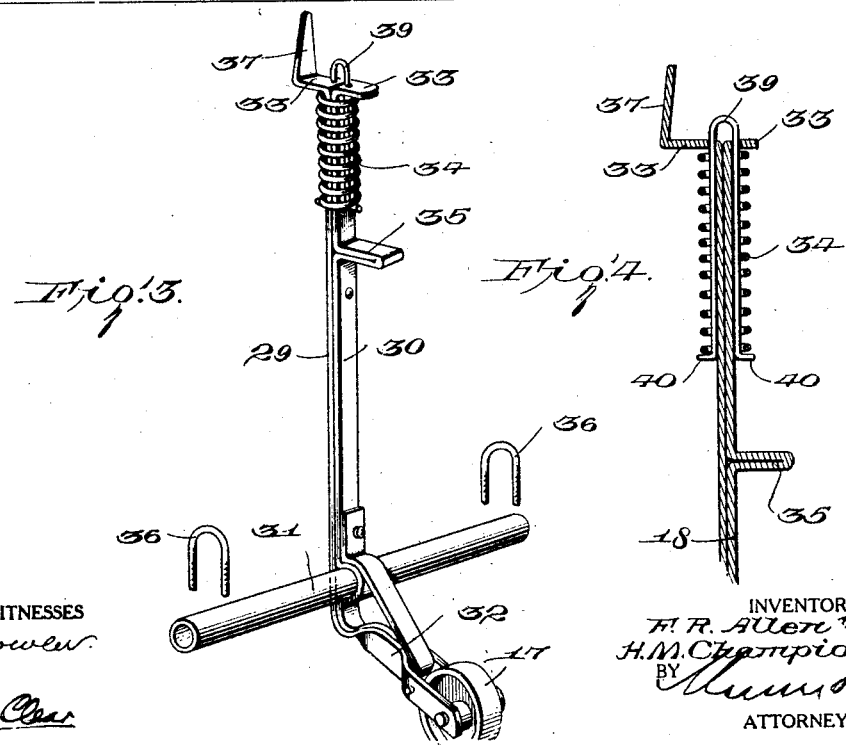

Patented Oct. 30, 1928.

1,690,045

UNITED STATES PATENT OFFICE.

FRANK R. ALLEN AND HENRY M. CHAMPION, OF PINE BLUFF, ARKANSAS.

DUMP BODY.

Application filed June 23, 1926. Serial No. 118,020.

Our present invention relates generally to dump bodies, and more particularly to a dump body which is pivoted and rearwardly tiltable, in connection with means for tilting the same from the driver's seat on the wagon forwardly of the body.

The primary object of the invention is the provision of a simple inexpensive apparatus of the above nature which may be operated manually without gears, cylinders, and other complicated parts involving the use of a source of power carried upon the vehicle, and connections, as for instance, pumps, motors and the like, and a further object is the provision of an apparatus adapted for manual operation and manipulation, which will operate under normal circumstances as a control and lock for the body to prevent the same from tilting and dumping and which will also act as a control for the body in its tilting or dumping movement.

With the above general objects in mind, further and more specific objects, as well as the resulting advantages of our present invention will appear in the course of the following description, reference being made to the accompanying drawings which form a part of this specification, and in which Figure 1 is a side view of our improved dump wagon complete, the body being shown locked in its normal position.

Figure 2 is a partial vertical longitudinal section showing the body in its rearwardly tilted or dumping position;

Figure 3 is a detailed perspective view of the dumping lever, and,

Figure 4 is a partial vertical section through the dumping lever shown in Fig. 3.

Referring now to these figures, our invention purposes a dumping wagon, the chassis of which may be conventional, including a frame having side beams 10, which is movable upon front and rear wheels 11 and 12. Upon the side beams 10 of the body are disposed sills 13, preferably of wood, to the rear ends of which the body 14 is pivotally connected as by means of hinges 15, so disposed with respect to the length of the body as to adapt the latter to ready tilting movement by a slight lifting of its forward end so as to permit the rearward shifting of the load of the body.

For the above purposes the body 14 may be constructed in any suitable manner, it being provided beneath its forward end in accordance with our invention, with a U-shaped strap 16, rigidly in connection therewith and adapted to form a shoe for engagement by the lower lifting roller 17 of the dumping lever 18.

Adjacent to its rear end and slightly spaced therefrom the sides of the body 14 have upright supports 19, to which the upper forwardly angular end 20 of a tail gate 21 is pivoted, whereby the body of the tail gate may swing forwardly and rearwardly to and from the rear end of the body 14, which it is normally adapted to close. Across the lower edge of the tail gate 21 is secured a strap 22 with an outstanding end. This end is normally engaged by a locking hook 23 pivotally mounted at 24 upon one side of the body and provided with an upstanding arm 25 to which the rear end of a connecting bar 26 is pivoted. This bar is pivotally connected at its forward end to a lever 27, which is pivotally mounted at the front end of the body 14, within easy reach of the operator upon the operator's seat 28. Obviously with this construction it is simply necessary for the operator to manipulate lever 27 in order to shift the hook 23 upwardly to released position, permitting the tail gate 21 to swing rearwardly and upwardly when the body 14 is tilted rearwardly and downwardly in the dumping position. It is likewise obvious as will be seen particularly from Fig. 2, that the upper angular portion 20 of the tail gate permits the latter to easily swing upwardly beneath and to ride the load discharging from the lower end of the body 14, without undue strain upon the tail gate. When the body is again righted in a horizontal position, shown in Fig. 1, the tail gate automatically swings to the closed position, and it is then an easy matter to shift the hook into engaged relation with the projecting end of the cross strap 22.

The dumping lever 18 is fulcrumed adjacent to its lower end, and in the present instance I have shown the same consisting of a pair of straps 29 and 30, whose lower portions snugly embrace and are secured to the central portion of a transverse fulcrum bar 31. Below this bar the straps are continued to form a rearwardly angular lower extension of the dumping lever, and their extremities at the end of this extension revolubly support the roller 17, which as before described, operates upwardly against the forward shoe of the body 14.

Around the upper portions of the straps 29 and 30, below their oppositely angular upper ends 33, a spring 34 is coiled, and below this spring the strap 30 has a portion doubled upon itself to form a rearwardly angular body engaging and locking lug 35.

The fulcrum bar 30 has its ends suitably journalled upon the before-mentioned sills 13, as by means of the U-bolts 36 shown for instance in Fig. 3, and in the normal position of the parts shown in Fig. 1, the lever 18 upstands at the front end of the body with its intermediate lug 35 projecting rearwardly over and in engagement with the upper forward edge of the body so that the latter is locked against rearward tilting or dumping movement.

The angular upper end 33 of the strap 29 has an upwardly deflected terminal 37, which forms a handle, and it is obvious that by reaching rearwardly the operator on the seat 28 may grasp the handle 37 and pull the dumping lever 18 forwardly or toward him. The result of this movement is to shift the lower rearwardly angular extension 32 of the dumping lever in an upward direction, forcing roller 17 against the body shoe 16, whereby to urge the forward portion of the body upwardly.

Previous to such operation tail gate 21 has of course been released so that immediately upon upward movement of the forward portion of the body 14, its load is free to shift rearwardly and the further movement of the body to the tilted dumping position of Fig. 2, requires but little manual effort and is induced for the most part by the shifting of the weight of the load in a rearward direction.

Within the forward end of the body 14, one end of a snubbing chain 38 is anchored. The other end of this chain is connected to a U-strap 39, whose extensions project downwardly through openings in the oppositely outstanding upper ends 33 of the straps 29 and 30, forming the dumping lever 18. These extensions of the U-strap 39 are in movable relation downwardly along the outer faces of the straps 29 and 30 within the spring 34, and, beyond the lower end of this spring 34, the lower ends of the strap extensions have outstanding terminals 40 which engage the lower end of the spring when there is any tendency of an upward pull upon the U-strap 39. This arrangement thus acts to snub the tilting or dumping movement of the body and to tension such movement after it has progressed to a certain point determined by the length of the snubbing chain 38.

It is obvious that a dumping apparatus such as we have proposed, without power actuated or other complicated parts, will be simple and economical both in first cost and up-keep, and it is further obvious that a dumping apparatus of the character thus disclosed will be the means of saving a great deal of time and labor and that the particular means proposed for the carrying out of the invention will present a strong, durable and general efficient apparatus for the intended purposes.

We claim:

1. In a dump wagon including a rearwardly tiltable body having a lower forward shoe, a dumping lever fulcrumed adjacent to its lower end and normally upstanding in an approximately vertical position along the front of the body, a flexible connection between the upper portion of the lever and the body and including a spring, said lever having a rearward extension below its fulcrum, and a roller carried by said extension and engaging the shoe of the body.

2. In a dump wagon including a rearwardly tiltable body having a lower forward shoe, a dumping lever fulcrumed adjacent to its lower end and normally upstanding in an approximately vertical position along the front of the body, said lever having a rearward extension below its fulcrum, and a roller carried by said extension and engaging the shoe of the body, a spring on the upper portion of the lever, an element movable in connection with the upper portion of the lever and engaging the said spring, and a flexible snubbing connection between the said element and the forward portion of the body, as described.

3. In a dump wagon including a rearwardly tiltable body and a frame, an upright dumping lever fulcrumed adjacent to its lower end in the frame forwardly beyond the body, said dumping lever having an upper handle and having a rearward extension below its fulcrum and adapted for engagement with the lower forward portion of the body when the handle portion of the lever is shifted forwardly, and a flexible snubbing connection between the upper portion of the lever and the forward portion of the body.

4. In a dump wagon including a rearwardly tiltable body and a frame, an upright dumping lever fulcrumed adjacent to its lower end in the frame forwardly beyond the body, said dumping lever having an upper handle and having a rearward extension below its fulcrum and adapted for engagement with the lower forward portion of the body when the handle portion of the lever is shifted forwardly, and a flexible snubbing connection between the upper portion of the lever and the forward portion of the body, including an elastic tensioning member supported by the lever.

FRANK R. ALLEN.
HENRY M. CHAMPION.